United States Patent
Lee (10) Patent No.: US 8,068,195 B2
(45) Date of Patent: Nov. 29, 2011

(54) PORTABLE DEVICE INCLUDING EXTERNAL-LIGHT-SHIELDING SHEET

(75) Inventor: Weon Woong Lee, Chungju-si (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 12/341,218

(22) Filed: Dec. 22, 2008

(65) Prior Publication Data

US 2009/0180189 A1    Jul. 16, 2009

(30) Foreign Application Priority Data

Jan. 14, 2008  (KR) .................. 10-2008-0004081
Apr. 18, 2008  (KR) .................. 10-2008-0036265

(51) Int. Cl.
*G02F 1/1335*  (2006.01)
(52) U.S. Cl. .................. 349/62; 359/601
(58) Field of Classification Search .......... 359/601; 349/62
See application file for complete search history.

(56) References Cited

U.S. PATENT DOCUMENTS

| 2005/0187333 | A1* | 8/2005 | Yoshizawa | 524/492 |
| 2006/0232523 | A1* | 10/2006 | Hori et al. | 345/76 |
| 2007/0211335 | A1* | 9/2007 | Ikeda et al. | 359/485 |
| 2008/0042997 | A1* | 2/2008 | Endo | 345/176 |
| 2008/0151555 | A1* | 6/2008 | Jo et al. | 362/330 |
| 2008/0197773 | A1* | 8/2008 | Cha et al. | 313/582 |
| 2009/0159344 | A1* | 6/2009 | Hotelling et al. | 178/18.06 |

FOREIGN PATENT DOCUMENTS

| KR | 10-2003-0062668 A | 7/2003 |
| KR | 10-2006-0080116 A | 7/2006 |
| KR | 10-2006-0120527 A | 11/2006 |
| KR | 10-0730137 B1 | 6/2007 |
| KR | 10-2008-0016308 A | 2/2008 |

OTHER PUBLICATIONS

Korean Office Action dated Jan. 6, 2010 for Application No. 10-2008-0036265.
Korean Office Action dated Jul. 15, 2009.

* cited by examiner

*Primary Examiner* — Phu Vu
(74) *Attorney, Agent, or Firm* — KED & Associates, LLP (57) ABSTRACT

A portable device including an external-light-shielding sheet is provided. The portable device includes a display panel; and an external-light-shielding sheet arranged on the display panel, wherein the external-light-shielding sheet includes a base portion and a plurality of wedge shaped portions arranged on the base portion to absorb external light. Therefore, it is possible to absorb and block as much external light as possible. In addition, it is possible to improve bright-room contrast by effectively realizing a black image on a display panel.

17 Claims, 9 Drawing Sheets

PORTABLE DEVICE INCLUDING EXTERNAL-LIGHT-SHIELDING SHEET

CROSS-REFERENCE TO RELATED APPLICATION

This application claims priority from Korean Patent Application No. 10-2008-0004081 filed on Jan. 14, 2008 and Korean Patent Application No. 10-2008-0036265 filed on Apr. 18, 2008 in the Korean Intellectual Property Office, the disclosure of which is incorporated herein by reference in its entirety.

BACKGROUND OF THE INVENTION

1. Field of the Invention

The present invention relates to a portable device including a external-light-shielding sheet, and more particularly, to a portable device which includes an external-light-shielding sheet disposed on a display panel and can thus improve the visibility and the anti-shock properties of the display panel.

2. Description of the Related Art

Portable devices generally include a controller (such as a central processing unit (CPU)) and a plurality of peripheral devices connected to the controller. Examples of the peripheral devices include a storage unit (such as a memory), a manipulation unit (such as a keypad or a keyboard), a display unit (such as a liquid crystal display (LCD) panel) and a camera module unit.

During the operation of a portable device, data may be transmitted between a controller and a plurality of peripheral devices of the portable device under the control of a software program.

When an LCD panel of a portable device realizes a black image, external light may be reflected from the front of the LCD panel. Thus, the black image may be mistakenly recognized as being brighter than it actually is, thereby reducing bright-room contrast.

SUMMARY OF THE INVENTION

The present invention provides a portable device which includes an external-light-shielding sheet disposed on a display panel and can thus improve the visibility and the anti-shock properties of the display panel.

According to an aspect of the present invention, there is provided a portable device including a display panel; and an external-light-shielding sheet arranged on the display panel, wherein the external-light-shielding sheet includes a base portion and a plurality of wedge shaped portions arranged on the base portion to absorb external light.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 1:
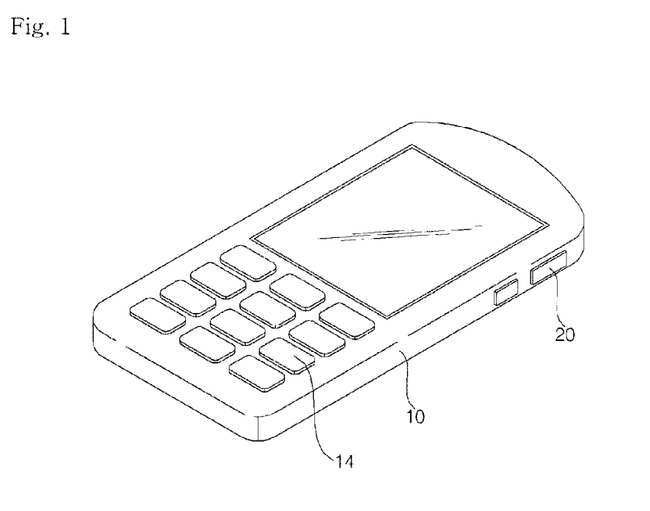
FIG. 1 illustrates a perspective view of a portable device including an external-light-shielding sheet, according to an exemplary embodiment of the present invention.

FIG. 1 illustrates a perspective view of a portable device including an external-light-shielding sheet, according to an exemplary embodiment of the present invention. Referring to FIG. 1, the portable device 10 may be a mobile communication terminal including an external-light-shielding sheet. The external-light-shielding sheet may be included in various types of display devices such as a portable multimedia player (PMP), a personal digital assistant (PDA), a navigation device, a portable TV, a portable monitor and an MP3 player.

The mobile communication terminal 10 may include a receiver (not shown) from which the voice of a person having phone conversation with a user of the mobile communication terminal 10 is output and a plurality of manipulation switches 14 which serve as an input device and are used to initiate or terminate a call. The mobile communication terminal 10 may also include a plurality of manipulation switches 20. The manipulation switches 20 may be disposed on one side of the mobile communication terminal 10 and may be used to increase or reduce volume or to perform a camera function.

The external-light-shielding sheet may block external light and may thus improve visibility. The structure of the external-light-shielding sheet will be described later in detail.

The mobile terminal 10 may also include a touch panel. The touch panel may be a display device capable of responding to a touch input made by the user. The user may interact with the mobile terminal 10 by touching an image or text data displayed on the touch panel with his/her finger.

Figure 2:
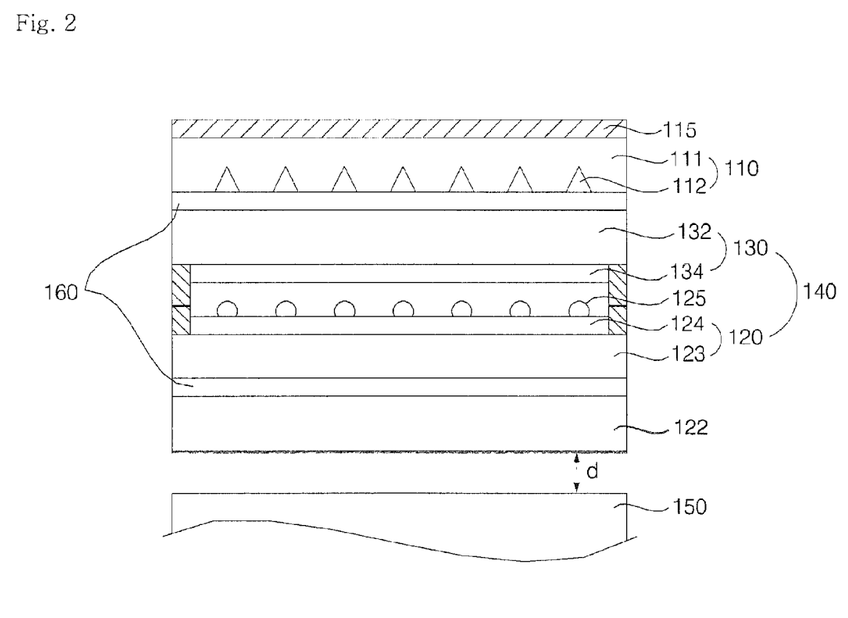
FIGS. 2 and 3 illustrate cross-sectional views of examples of the portable device shown in FIG. 1.
Figure 3:
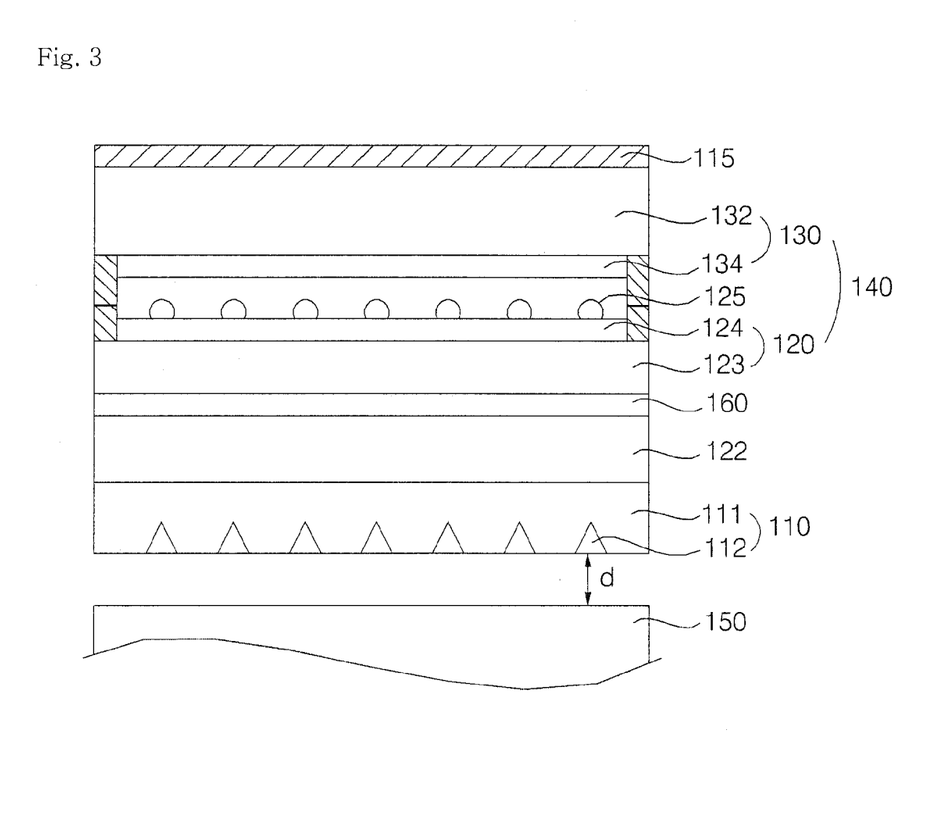

FIGS. 2 and 3 illustrate cross-sectional views of examples of the mobile communication terminal 10 shown in FIG. 1. Referring to FIGS. 2 and 3, a mobile communication terminal may include a display panel 150, an external-light-shielding sheet 110 disposed on the display panel 150, and a touch panel 140 disposed between the display panel 150 and the external-light-shielding sheet 110.

The touch panel 140 will hereinafter be described in detail.

The touch panel 140 may be a resistive-type touch panel, but the present invention is not restricted to this. That is, various types of touch panels, other than a resistive-type touch panel, may be used as the touch panel 140. For example, the touch panel 140 may be a capacitive-type touch panel or an electromagnetic-type touch panel.

Referring to FIG. 2, the touch panel 140 may include an upper electrode sheet 130 and a lower electrode sheet 120. The upper electrode sheet 130 and the lower electrode sheet 120 may face each other.

The upper electrode sheet 130 may include an upper substrate 132, an upper resistive layer 134 attached onto the bottom of the upper substrate 132, and an upper electrode (not shown) electrically connected to the upper resistive layer 134.

The upper substrate 132 may include at least one of the following transparent materials: polyethyleneterephthalate (PET), polymethylmethacrylate (PMMA) and polycarbonate (PC).

If the upper substrate 132 is formed of PET, the upper substrate 132 may be able to easily emit light generated by the touch panel 140 due to the high transparency of PET. If the upper substrate 132 is formed of PMMA, the upper substrate 132 may be highly heat-resistant and may thus be suitable for use in a large-scale display device having the tendency to generate too much heat. If the upper substrate 132 is formed of PC, the upper substrate 132 may have excellent anti-shock, heat-resistant, weathering-resistant, self-extinguishing and transparency properties. Since PC is about 150 times more shock-resistant than toughened glass, the upper substrate 132 may be highly flexible and can be easily processed.

The upper resistive layer 134 may be formed of one of indium tin oxide (ITO), tin oxide (TO), indium zinc oxide (IZO) and indium tin zinc oxide (ITZO).

The lower electrode sheet 120 may include a lower substrate 123 and a lower resistive layer 124 disposed on the lower substrate 123. A plurality of dot spacers 125 may be disposed on the lower resistive layer 124. A functional film 122 may be disposed below the lower substrate 123.

The dot spacers 125 may be circular or rectangular. The dot spacers 125 are illustrated in FIG. 2 as being disposed on the lower resistive layer 124, but the present invention is not restricted to this. That is, the dot spacers 125 may be disposed on the upper resistive layer 134.

The dot spacers 125 may be uniformly spaced from one another and may be formed through printing. The dot spacers 125 may be formed using an ultraviolet (UV)-cured resin ink material. The distance between the centers of a pair of adjacent dot spacers 125, i.e., the pitch between the pair of adjacent dot spacers 125, may be about 0.5 to 2 mm. The dot spacers 125 are illustrated in FIG. 2 as being spherical, but the present invention is not restricted. That is, the dot spacers 125 may be formed as ellipsoids, and particularly, horizontally-elongated spheres.

The lower substrate 123, like the upper substrate 132, may include at least one of PET, PMMA and PC. The lower resistive layer 124, like the upper resistive layer 134, may be formed of one of ITO, TO, IZO and ITZO. The functional film 122 is a film disposed below the lower substrate 123 and may include PET.

The lower electrode sheet 120 may also include a lower electrode (not shown) electrically connected to the lower resistive layer 124 and an induction line (not shown) connecting the lower electrode to a connector.

If a user touches a portion of the upper electrode sheet 130 of the touch panel 140 with a pen or his/her finger, the upper electrode of the upper electrode sheet 130 and the lower electrode of the lower electrode sheet 120 may be electrically connected by the dot spacers 125, and a variation in the voltage of the touched portion of the upper electrode sheet may be detected. Then, the coordinates of the touched portion of the upper electrode sheet may be determined based on the detected voltage variation.

The external-light-shielding sheet 110 may be disposed on the upper electrode sheet 130. Alternatively, referring to FIG. 3, the external-light-shielding sheet 110 may be disposed below the lower substrate 123 of the lower electrode sheet 120. That is, the external-light-shielding sheet 110 may be disposed on the upper electrode sheet 130 and/or at the bottom of the lower substrate 123 of the lower electrode sheet 120, respectively. In this case, the external-light-shielding sheet 110 at the bottom of the lower substrate 123 of the lower electrode sheet 120 may block external light independently from the external-light-shielding sheet 110 on the upper electrode sheet 130.

The structure of the external-light-shielding sheet 110 will be described later in further detail.

Figure 9:
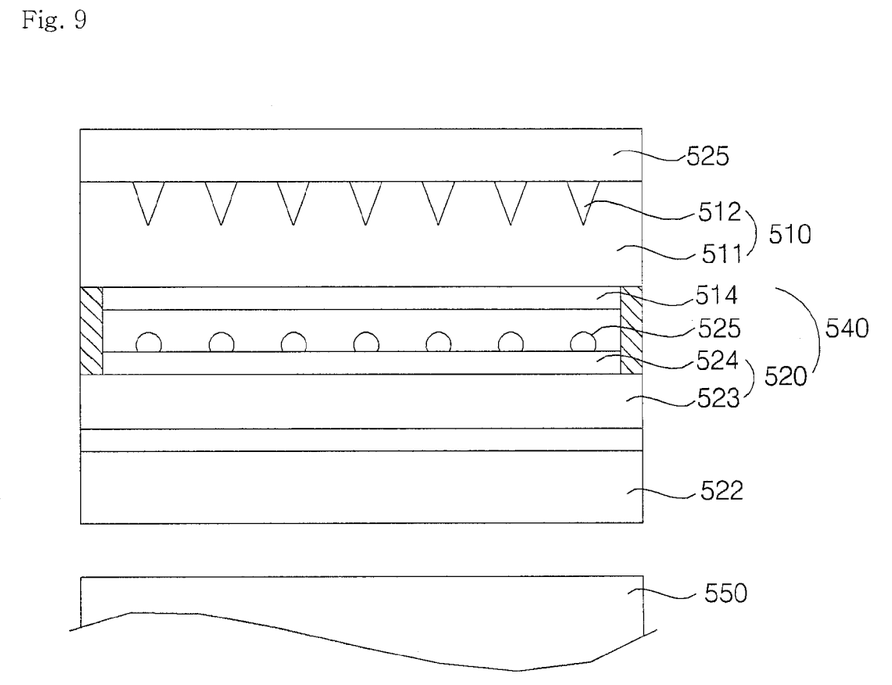
FIG. 9 illustrates a cross-sectional view of a portable device including an external-light-shielding sheet, according to another exemplary embodiment of the present invention.

A hard-coating portion may be formed on the external-light-shielding sheet 110. Referring to FIG. 2, the hard-coating portion may be a hard-coating material 115 coated on the external-light-shielding sheet 110. Alternatively, referring to FIG. 9, the hard-coating portion may be a hard-coating film 525 attached on the external-light-shielding sheet 110. Referring to FIG. 2, the top surface of the external light shield sheet 110 may be thinly coated with a hard-coating material 115, instead of forming the hard-coating film 525 on the external-light-shielding sheet 110, as shown in FIG. 9, in order to uniformly maintain the thickness of the touch panel 140.

Since the external-light-shielding sheet 110 is thinly coated with the hard-coating material 115, it is possible to prevent the top surface of the upper electrode sheet 140 from being scratched or cut by the user's hand or an input device such as a pen when the user tries to touch and choose a certain part of the touch panel 140.

The hard-coating material 115 may include an acrylic binder, a urethane binder, an epoxy binder or a siloxane binder. The hard-coating material 115 may also include a silica-based filler in order to improve the hardness of the hard-coating material 115. Referring to FIGS. 2 and 3, spaces 160 between the upper substrate 132 and the external-light-shielding sheet 110, between the lower substrate 123 and the functional film 122, and between the lower substrate 123 and the functional film 122 may be filled with air or an adhesive.

The touch panel 140 may be disposed at the front of the display panel 150 of a display device. The display panel 150 may be a liquid crystal panel, a plasma display panel (PDP), a field emission device or an electroluminescent device.

Figure 4A:
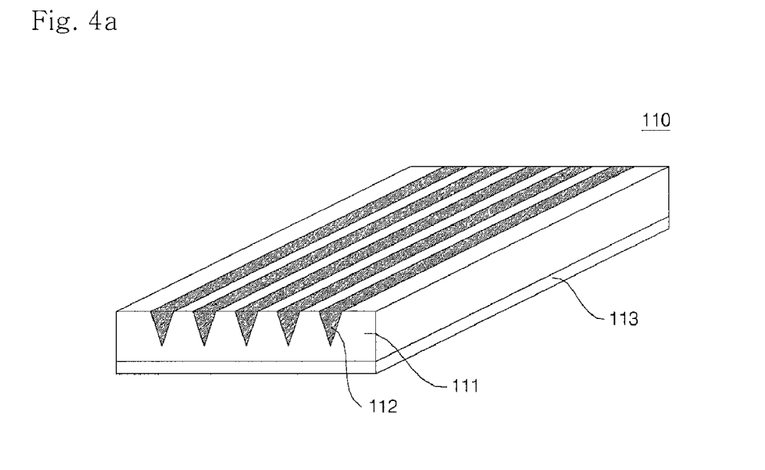
FIGS. 4A-4C illustrate diagrams of examples of t external-light-shielding sheet shown in FIG. 2 or 3.
Figure 4B:
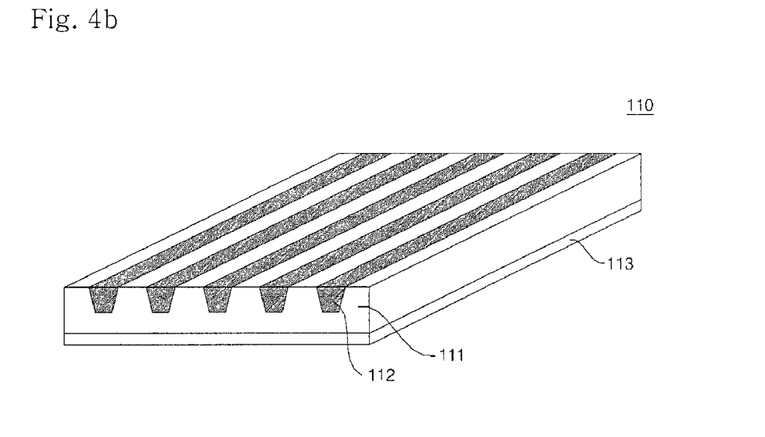
Figure 4C:
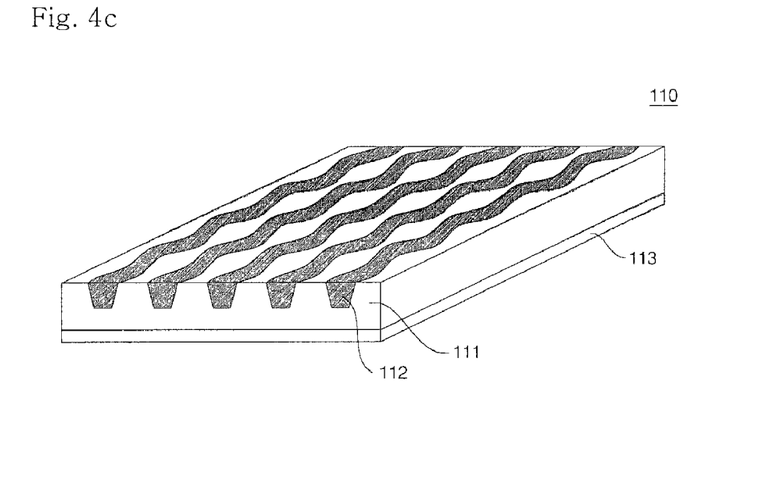

FIGS. 4A and 4C illustrate cross-sectional views of examples of the external-light-shielding sheet 110 shown in FIG. 2 or 3. Referring to FIG. 4A, the external-light-shielding sheet 110 may include a base film 113, a base portion 111 and a plurality of wedge-shaped portions 112. The base film 113 may be formed of PET. The base portion 111 and the wedge-shaped portions 112 may be formed on the base film 113.

The base portion 111 may be formed of a transparent material, for example, UV-cured resin, in order to smoothly transmit light therethrough. Alternatively, the base portion 111 may be formed of a glass material in order to effectively protect the front of the display panel 150.

The wedge-shaped portions 112 may be formed on the base portion 111 and may absorb external light. The wedge-shaped portions 112 may have a triangular cross-section. Alternatively, the wedge-shaped portions 112 may have a trapezoidal cross-section, as shown in FIG. 4B. Still alternatively, the wedge-shaped portions 112 may have various cross-sectional shapes, other than those set forth herein, such as a rectangular cross-sectional shape. The wedge-shaped portions 112 may extend along the longitudinal direction of the external-light-shielding sheet 110 in a zigzag fashion, as shown in FIG. 4C, and may thus prevent the occurrence of a moiré phenomenon.

Each of the wedge-shaped portions 112 may include a wide portion and a narrow portion. The wide portion will hereinafter be referred to as a lower portion, and the narrow portion will hereinafter be referred to as an upper portion.

The wedge-shaped portions 112 may be formed of a darker material than that of the base portion 111. More specifically, the wedge-shaped portions 112 may be formed of a black material. For example, the wedge-shaped portions 112 may be formed of a carbon-based material or may be coated with a black dye, thereby maximizing the absorption of external light by the external-light-shielding sheet 110.

Each of the wedge-shaped portions 112 may contain light-absorption particles. The light-absorption particles may be stained resin particles. The light-absorption particles may be stained black. The light-absorption particles may be formed of carbon black.

The light-absorption particles may be formed to have a diameter of 1 μm or more in order to facilitate the addition of the light-absorption particles into the wedge-shaped portions 112 and maximize the absorption of external light by the external-light-shielding sheet 110. If the diameter of the light-absorption particles is larger than 1 μm, each of the wedge-shaped portions 112 may include 10 wt % or more of light-absorption particles in order to effectively absorb external light refracted thereinto. The weight percent of the light-absorption particles in each of the wedge-shaped portions 112 may be 10% or more.

FIGS. 5 through 8 illustrate cross-sectional views for explaining the relationship between the structure and the optical properties of the external-light-shielding sheet 110 shown in FIG. 2 or 3. Referring to FIGS. 5 through 8, the wedge-shaped portions 112 may be formed so that the lower portions of the wedge-shaped portions 112 can face the display panel 150, and that the upper portions of the wedge-shaped portions 112 can face an observer. Alternatively, the wedge-shaped portions 112 may be formed so that the lower portions of the wedge-shaped portions 112 can face the observer, and that the upper portions of the wedge-shaped portions 112 can face the display panel 150.

External light provided by an external light source over the display panel 150 may be diagonally incident upon the display panel 150 and may thus be absorbed by the wedge-shaped portions 112.

Figure 5:
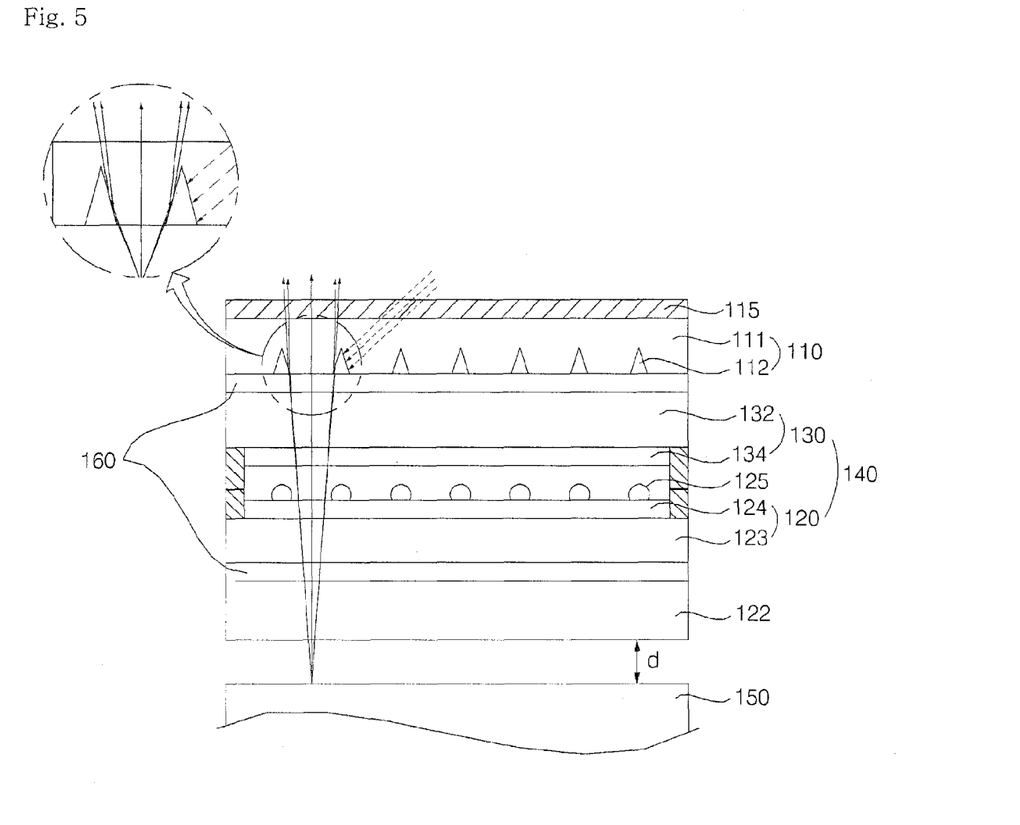
FIGS. 5 through 8 illustrate cross-sectional views for explaining the relationship between the structure and the optical properties of the external-light-shielding sheet shown in FIG. 2 or 3.

FIG. 5 illustrates the case in which the refractive index of the wedge-shaped portions 112 is set lower than the refractive index of the base portion 111 in order to totally reflect visible rays emitted from the display panel 150 and thus to improve the reflection of panel light.

The source of external light, which reduces the bright-room contrast of the display panel 150, is highly likely to be disposed over the display panel 150. According to Snell's law, external light diagonally incident upon the external-light-shielding sheet 110 may be refracted into the wedge-shaped portions 112, as indicated by dotted lines of FIG. 5, because the refractive index of the wedge-shaped portions 112 is lower than the refractive index of the base portion 111. The external light refracted into the wedge-shaped portions 112 may be absorbed by the light-absorption particles in each of the wedge-shaped portions 112.

Light (hereinafter referred to as panel light) emitted from the display panel 150 may be totally reflected toward the observer outside the external-light-shielding sheet 110, as indicated by solid lines, by the slanted surfaces of each of the wedge-shaped portions 112.

More specifically, since the angles between panel light and the slanted surfaces of each of the wedge-shaped portions 112 are larger than the angles between external light and the slanted surfaces of each of the wedge-shaped portions 112, external light may be refracted into and thus absorbed by the wedge-shaped portions 112, whereas panel light may be totally reflected by the wedge-shaped portions 112.

In short, the external-light-shielding sheet 110 may absorb external light and may thus prevent the external light from being reflected toward the observer. In addition, the external-light-shielding sheet 110 may increase the amount of panel light and may thus improve the bright-room contrast of an image displayed by the display panel 150.

In order to maximize the absorption of external light and the total reflection of light by the display panel 150 in consideration of the incident angle of external light, the refractive index of the wedge-shaped portions 112 may be set 0.3-1 times higher than the refractive index of the base portion 111. More specifically, in order to maximize the total reflection of panel light by the slanted surfaces of each of the wedge-shaped portions 112, the refractive index of the wedge-shaped portions 112 may be set 0.30000-0.9999 times higher than the refractive index of the base portion 111 in consideration of the vertical viewing angles of the display panel 150.

Figure 6:
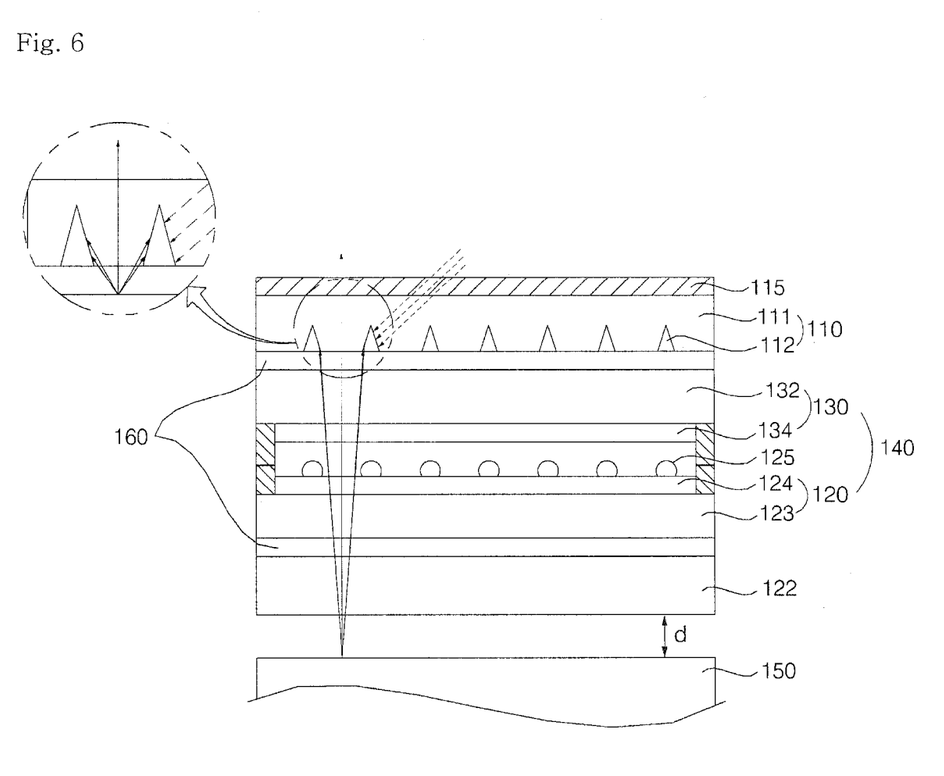

FIG. 6 illustrates the case in which the wedge-shaped portions 112 are arranged so as for the upper portions of the wedge-shaped portions 112 to face the observer and the refractive index of the wedge-shaped portions 112 is set higher than the refractive index of the base portion 111. Referring to FIG. 6, since the refractive index of the wedge-shaped portions 112 is higher than the refractive index of the base portion 111, external light and panel light may both be absorbed by the wedge-shaped portions 112 according to Snell's law.

Therefore, when the upper portions of the wedge-shaped portions 112 face the observer and the refractive index of the wedge-shaped portions 112 is higher than the refractive index of the base portion 111, it is possible to reduce the probability of the occurrence of a ghost phenomenon in which an image is blurrily displayed. In order to sufficiently absorb panel light diagonally incident upon the wedge-shaped portions 112 and thus to prevent the occurrence of the ghost phenomenon, the difference between the refractive index of the wedge shaped portions 112 and the refractive index of the base portion 111 is about 0.001 to about 0.3.

When the refractive index of the wedge-shaped portions 112 is higher than the refractive index of the base portion 111, the transmittance and the bright-room contrast of the external-light-shielding sheet 110 may both decrease. Therefore, in order to prevent the occurrence of the ghost phenomenon without compromising the transmittance of the external-light-shielding sheet 110, the difference between the refractive index of the wedge shaped portions 112 and the refractive index of the base portion 111 is about 0.001 to about 0.05.

In addition, in order to prevent the occurrence of the ghost phenomenon while uniformly maintaining the bright-room contrast of the display panel 150, the refractive index of the wedge-shaped portions 112 may be set 1.0-1.3 times higher than the refractive index of the base portion 111.

Figure 7:
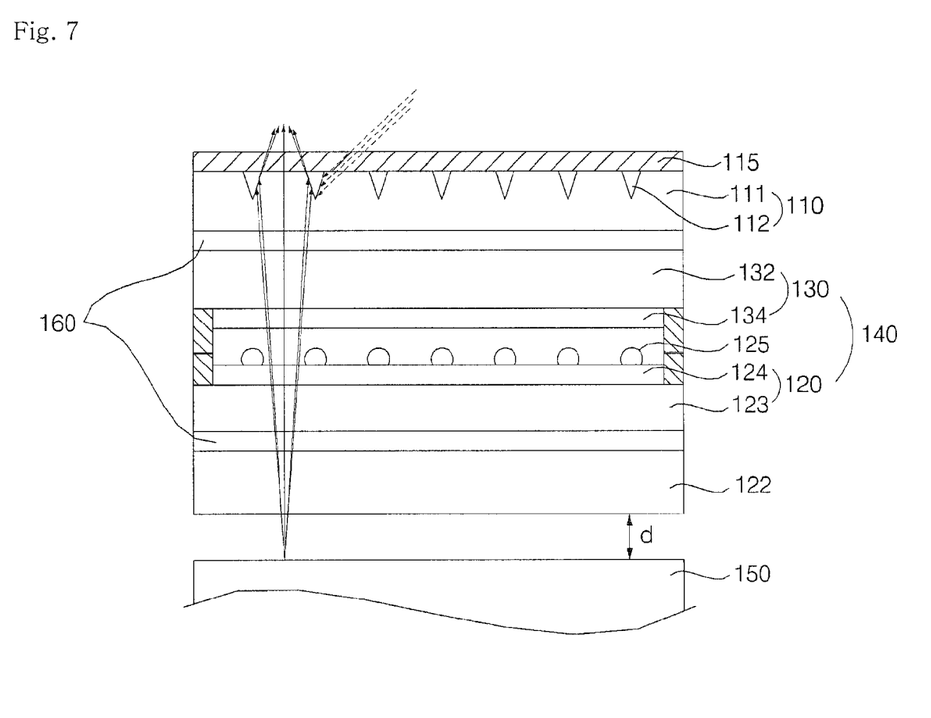

FIG. 7 illustrates the case in which the wedge-shaped portions 112 are arranged so as for the lower portions of the wedge-shaped portions 112 to face the observer and the refractive index of the wedge-shaped portions 112 is set lower than the refractive index of the base portion 111. Referring to FIG. 7, since the lower portions of the wedge-shaped portions 112 face the observer, the lower portions of the wedge-shaped portions 112 may thus be able to effectively absorb external light. Thus, it is possible to improve the shielding of external light. In addition, since the distance between a pair of adjacent wedge-shaped portions 112 is greater than the distance between a pair of adjacent wedge-shaped portions of FIG. 6, it is possible to increase the aperture ratio of the external-light-shielding sheet 110.

Referring to FIG. 7, panel light may be reflected from the slanted surfaces of each of the wedge-shaped portions 112 and may thus be concentrated after passing through the base portion 111. Therefore, it is possible to reduce the probability of occurrence of the ghost phenomenon without compromising the transmittance of the external-light-shielding sheet 110.

In order to effectively prevent the occurrence of the ghost phenomenon, a distance d between the display panel 150 and the touch panel 140 may be 0.1-3 mm.

Figure 8:
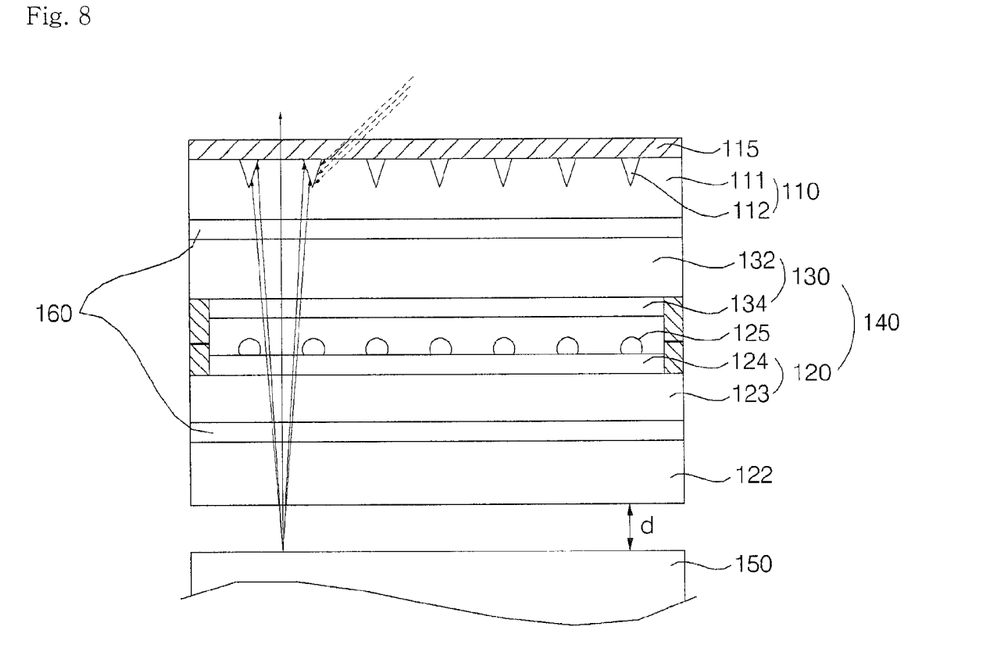

FIG. 8 illustrates the case in which the wedge-shaped portions 112 are arranged so as for the lower portions of the wedge-shaped portions 112 to face the observer and the refractive index of the wedge-shaped portions 112 is set higher than the refractive index of the base portion 111. Referring to FIG. 8, since the refractive index of the wedge-shaped portions 112 is higher than the refractive index of the base portion 111, panel light incident upon the slanted surfaces of each of the wedge-shaped portions 112 may be absorbed by the slanted surfaces of each of the wedge-shaped portions 112. Accordingly, it is possible to reduce the probability of occurrence of the ghost phenomenon due to panel light transmitted through the base portion 111.

In addition, since the refractive index of the wedge-shaped portions 112 is higher than the refractive index of the base portion 111, it is possible to improve the absorption of external light.

The external-light-shielding sheet 110 shown in any one of FIGS. 5 through 8 can be applied to a portable device not including a touch panel. For example, a portable device including an LCD module (LCM), but not having a touch panel, may be equipped with an external-light-shielding sheet, thereby improving the visibility of the portable device.

An LCM may be fabricated using chip-on-board (COB), chip-on-glass (COG), tape carrier packages (TCPs), and tape-automated bonding (TAB).

FIG. 9 illustrates a cross-sectional view of a portable device including an external-light-shielding sheet, according to another exemplary embodiment of the present invention. The exemplary embodiment of FIG. 9 will hereinafter be described in detail, focusing mainly on differences with the exemplary embodiment of FIG. 2 or 3.

Referring to FIG. 9, an upper electrode sheet may include an upper resistive layer 514. The upper resistive layer 514 may be formed on one surface of an external-light-shielding sheet 510. More specifically, the upper resistive layer 514 may be formed on the bottom surface of a base portion 511 of the external-light-shielding sheet 510, whereas, in the exemplary embodiment of FIG. 2 or 3, the upper resistive layer 134 is formed on the bottom surface of the upper substrate 132. That is, a touch panel 540, unlike the touch panel 140 of FIG. 2 or 3, does not include an upper substrate. Thus, the external-light-shielding sheet 510 may perform the functions of an upper substrate. A touch panel including both an upper substrate and an external-light-shielding sheet may be too thick. In order to address this problem, the upper resistive layer 514 may be formed on the bottom surface of the base portion 511 of the external-light-shielding sheet 510, thereby reducing the thickness of a touch panel 540.

A hard-coating portion 525 may be formed on one surface of the external-light-shielding sheet 510. More specifically, a hard-coating film 525 may be attached on one surface of the external-light-shielding sheet 510. Since the external-light-shielding sheet 510 performs the functions of an upper substrate, it is possible to reduce the thickness of the touch panel 540 by not including an upper substrate in the touch panel 540. Thus, in order to effectively protect the surface of the upper electrode sheet of the touch panel 540, the hard-coating film 525 may be attached onto one surface of the external-light-shielding sheet 510 using an adhesive. Therefore, it is possible to effectively prevent the surface of the upper electrode sheet of the touch panel 540 from being scratched or cut by a user's hand or an input device such as a pen.

Figure 10:
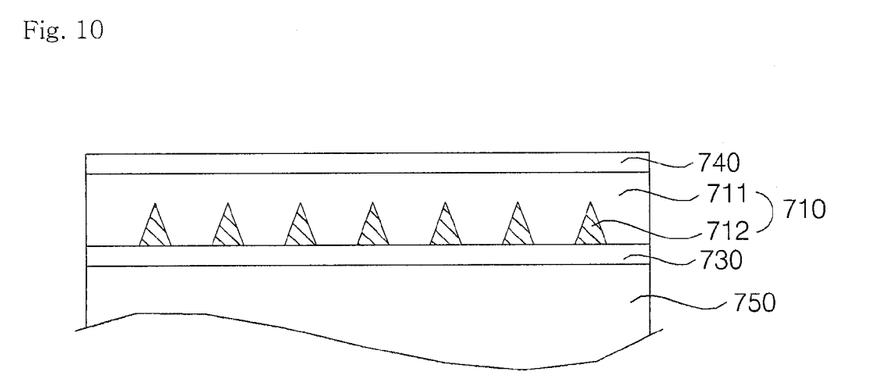
FIG. 10 illustrates a cross-sectional view of a portable device including an external-light-shielding sheet, according to another exemplary embodiment of the present invention.

FIG. 10 illustrates a cross-sectional view of a portable device including an external-light-shielding sheet, according to another exemplary embodiment of the present invention. Referring to FIG. 10, the portable device may include a panel 750, an external-light-shielding sheet 710, and a hard-coating portion 740.

The external-light-shielding sheet 710 may include a base portion 711 and a plurality of wedge-shaped portions 712. The external-light-shielding sheet 710 may absorb external light and may thus improve contrast.

The hard-coating portion 740 may be formed on one surface of the external-light-shielding sheet 710. The hard-coating portion 740 may be one of a hard-coating material coated on one surface of the external-light-shielding sheet 710 or a hard-coating film attached on one surface of the external-light-shielding sheet 710.

Figure 11:
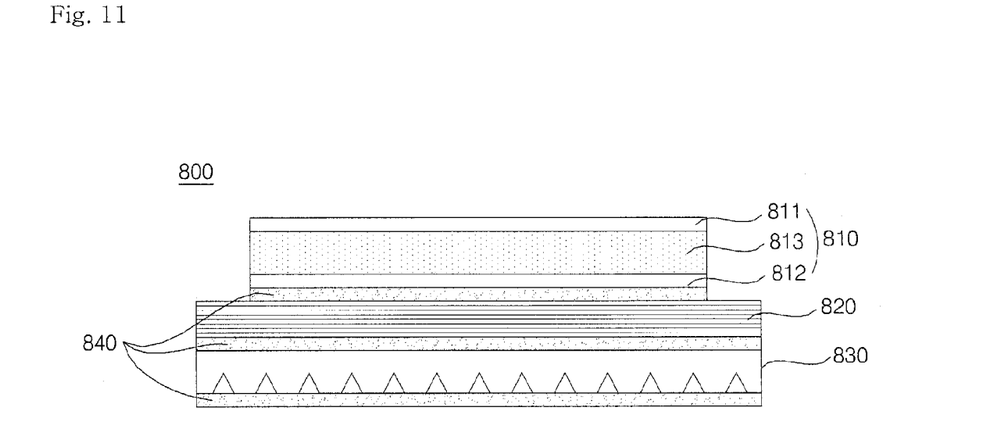
FIG. 11 illustrates a cross-sectional view of a filter that can be included in the portable device.

FIG. 11 illustrates a cross-sectional view of a filter 800 that can be included in the portable device shown in any one of FIGS. 1, 9 and 10. Referring to FIG. 11, at least one of an anti-reflection (AR)/near infrared (NIR) sheet 810 and an electromagnetic interference (EMI) shielding sheet 820 may be formed on one surface of the external-light-shielding sheet 830. A plurality of adhesive layers 840 may be formed between the AR/NIR sheet 810 and the EMI shielding sheet 820 and between the EMI shielding sheet 820 and the external-light-shielding sheet 830.

The AR/NIR sheet 810 may include a base sheet 813, which is formed of a transparent plastic material, an AR layer 811, which is formed on the top surface of the base sheet 813 and reduces glare by preventing the reflection of external light, and an NIR shielding sheet 812, which is formed on the bottom surface of the base sheet 813 and can allow signals to be transmitted normally by an infrared (IR) ray (such as a remote control) by blocking NIR rays emitted from a display panel (not shown).

The EMI shielding sheet 820 may block EMI by preventing electromagnetic radiation from being emitted from the display panel. The EMI shielding sheet 820 may include a plurality of layers having conductivity. More specifically, the EMI shielding sheet 820 may include a plurality of metal layers and a plurality of transparent layers having conductivity. The metal layers and the transparent layers may be alternately deposited on the external-light-shielding sheet 830.

The adhesive layers 840 may be formed between the AR/NIR sheet 810 and the EMI shielding sheet 820 and between the EMI shielding sheet 820 and the external-light-shielding sheet 830 and may firmly attach the AR/NIR sheet 810, the EMI shielding sheet 820 and the external-light-shielding sheet 830 to the front of the display panel. Each of the AR/NIR sheet 810, the EMI shielding sheet 820 and the external-light-shielding sheet 830 may include a base sheet. In this case, the base sheets of the AR/NIR sheet 810, the EMI shielding sheet 820 and the external-light-shielding sheet 830 may be formed of the same material.

The AR/NIR sheet 810, the EMI shielding sheet 820 and the external-light-shielding sheet 830 are illustrated in FIG. 11 as being sequentially deposited, but the present invention is not restricted to this. At least one of the AR/NIR sheet 810, the EMI shielding sheet 820 and the external-light-shielding sheet 830 may not be included in the filter 800. One or more other functional layers other than those shown in FIG. 11 may be additionally included in the filter 800.

At least one of the AR/NIR sheet 810, the EMI shielding sheet 820 and the external-light-shielding sheet 830 may not include any base sheet. Alternatively, each of the AR/NIR sheet 810, the EMI shielding sheet 820 and the external-light-shielding sheet 830 may include a base sheet, and one of the base sheets of the AR/NIR sheet 810, the EMI shielding sheet 820 and the external-light-shielding sheet 830 may be formed of glass, instead of a plastic material, in order to effectively protect the display panel. Whichever of the base sheets of the AR/NIR sheet 810, the EMI shielding sheet 820 and the external-light-shielding sheet 830 is formed of glass may be a predetermined distance apart from the display panel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A portable device comprising:
   a display panel; and
   an external-light-shielding sheet arranged on the display panel,
   wherein the external-light-shielding sheet includes a base portion and a plurality of wedge shaped portions arranged on the base portion to absorb external light, and
   wherein each of the wedge shaped portions has a wider portion and a narrow portion, the narrow portion facing the display panel.

2. The portable device of claim 1, further comprising a touch panel disposed between the external-light-shielding sheet and the display panel.

3. The portable device of claim 1, wherein the touch panel is one of a resistive-type touch panel, a capacitive-type touch panel and an electromagnetic-type touch panel.

4. The portable device of claim 1, further comprising a hard-coating film disposed on the external-light-shielding sheet.

5. The portable device of claim 1, wherein the external-light-shielding sheet further includes a hard-coating material coated thereon.

6. The portable device of claim 1, wherein the wedge shaped portions include a plurality of light-absorption particles.

7. The portable device of claim 1, wherein the base portion includes at least one of an ultraviolet (UV)-cured resin and a glass material.

8. The portable device of claim 1, wherein the refractive index of the wedge shaped portions is about 0.3 times to about 0.999 times higher than the refractive index of the base portion.

9. The portable device of claim 1, wherein the refractive index of the wedge shaped portions is higher than the refractive index of the base portion and the difference between the refractive index of the wedge shaped portions and the refractive index of the base portion is about 0.001 to about 0.3.

10. The portable device of claim 1, wherein the external-light-shielding sheet further includes at least one of an anti-reflection (AR) layer preventing the reflection of external light, an near infrared (NIR) shielding layer shielding near infrared rays emitted from the display panel, and an electromagnetic interference (EMI) shielding layer shielding electromagnetic waves.

11. The portable device of claim 2, wherein the distance between the display panel and the touch panel is about 0.1 mm to about 3 mm.

12. The portable device of claim 4, wherein the hard-coating film includes a silica-based filler reinforcing the hard-coating film.

13. The portable device of claim 5, wherein the hard-coating material includes a silica-based filler reinforcing the hard-coating material coated on the external-light-shielding sheet.

14. The portable device of claim 1, further comprising a touch panel disposed on the external-light-shielding sheet.

15. The portable device of claim 1, wherein the display panel is any one of a liquid crystal display (LCD) panel, an organic electroluminescence (EL) panel, and a plasma display panel (PDP).

16. The portable device of claim 1, wherein the portable device is one of a mobile phone, a portable multimedia player (PMP) and a personal digital assistant (PDA).

17. The portable device of claim 2, wherein the touch panel includes a lower electrode sheet having a plurality of dot spacers and the pitch between a pair of adjacent dot spacers is about 0.5 mm to about 2 mm.

* * * * *